United States Patent Office 3,423,435
Patented Jan. 21, 1969

3,423,435
PROCESS AND INTERMEDIATES FOR MANUFACTURE OF 3-HYDROXY-17-KETO STEROIDS
Paul D. Klimstra, Northbrook, Ill., assignor to G. D. Searle & Co., Chicago, Ill., a corporation of Delaware
No Drawing. Filed June 30, 1965, Ser. No. 468,578
U.S. Cl. 260—397.4                12 Claims
Int. Cl. C07c 169/22, 167/14, 167/10

ABSTRACT OF THE DISCLOSURE

A novel process and novel intermediates useful for the manufacture of 3-hydroxy-17-keto steroids. In that process a 3-keto group is reduced while the 17-acyloxy-17-cyano group is maintained intact and the latter protecting group is subsequently removed by alkaline cleavage to regenerate the 17-ketone.

The present invention is concerned with a process for the manufacture of 3-hydroxy-17-keto steroids and with the novel intermediates utilized in that process. Included in the process are the successive steps of selective formation of the cyanohydrin derivative of the 17-keto group, formation of the 17-ester of the cyanohydrin, reduction of the 3-keto group while maintaining the acylated cyanohydrin moiety intact and finally regeneration of the 17-keto group by reaction with an alkaline reagent under mild conditions. The acylation step provides the advantage that cleavage of the cyanohydrin moiety is avoided, thus preventing simultaneous reduction of the 17-keto group. The 17-acyloxy-17-cyano intermediates of this invention thus possess the unexpected advantage of suitability in a key step of the instant process in contrast to the corresponding 17-hydroxy-17-cyano substances which are inoperable for that purpose.

Specific examples of 3,17-diketo substances suitable for utilization as starting materials in the present process are androst-4-ene-3,17-dione, estr-4-ene-3,17-dione, 11β-hydroxyandrost-4-ene-3,17-dione, 11β-hydroxyestr-4-ene-3,17-dione, and 10β-carboxyestr-4-ene-3,17-dione. Alternatively, derivatives of 3,17-diketones wherein the 3-position is substituted by a group readily convertible to a keto group are suitable as starting materials. A particularly preferred starting material of that type is 3-methoxyestra-2,5(10)-dien-17-one, which is readily obtained by the Birch reduction of estrone 3-methyl ether.

The cyanohydrins obtained in the initial step of the process comprising the present invention are conveniently produced by contacting the aforementioned 17-keto starting materials with a source of hydrogen cyanide. Suitable sources are gaseous hydrogen cyanide, liquid hydrogen cyanide, alkali metal cyanides such as potassium cyanide and cyanohydrins of simple ketones such as acetone cyanohydrin. The latter cyanohydrin is an especially convenient reagent in view of its high order of reactivity and its ease of handling. The exchange cyanohydrin reaction is conducted by heating with an excess of that reagent, preferably in the presence of a basic catalyst such as triethylamine or pyridine. By that procedure, for example, 3-methoxyestra-2,5(10)-dien-17-one is heated briefly with acetone cyanohydrin in the presence of a catalytic quantity of triethylamine to afford 17-cyano-17-hydroxyestra-2,5(10)-dien-3-ol 3-methyl ether.

The cyanohydrins produced by the reaction described in the foregoing paragraph are obtained as mixtures of the 17β-hydroxy-17α-cyano and 17α-hydroxy-17β-cyano isomers. These isomeric mixtures can be utilized in the succeeding steps of the instant process as such; thus, separation and isolation of the two isomers is not required. In the structural formulas included in the present application, the alternative α and β configurations of the hydroxy and cyano groups of the cyanohydrin moiety are indicated by wavy lines.

Acylation of the 17-hydroxy group of the cyanohydrins produced in the initial step of the instant process is accomplished by reaction with the appropriate acid anhydride or halide, preferably in the presence of a suitable acid acceptor such as pyridine, triethylamine, sodium hydroxide, potassium hydroxide, sodium carbonate, etc. Acid anhydrides and halides suitable for utilization in that reaction are those derived from alkyl, aryl, aralkyl, and cycloalkyl carboxylic acids. Especially preferred are those derived from lower alkanoic acids, such as acetic, propionic, butyric, valeric, caproic and heptanoic. The aforementioned 17-cyano-17-hydroxyestra-2,5(10)-dien-3-ol 3-methyl ether, for example, is contacted at room temperature with acetic anhydride in pyridine solution to yield 17-acetoxy-17-cyanoestra-2,5(10)-dien-3-ol 3-methyl ether.

The 17-acyloxy-17-cyano intermediates above described are contacted with a reagent capable of reducing the 3-keto group. Reducing agents operable in the procedure are typified by lithium aluminum hydride, lithium aluminum hydride together with a lower alkanol such as ethanol, lithium tri-(tertiary-butoxy) aluminum hydride and diisobutyl aluminum hydride. In the instances wherein the 3-position carries the protected keto group, that moiety is preferably removed. Thus, the aforementioned 17-acetoxy-17-cyanoestra-2,5(10)-dien-3-ol 3-methyl ether is heated with dilute hydrochloric acid in methanol to afford 17-acetoxy-17-cyanoestr-4-en-3-one. When that enol ether is contacted with a weak acid, such as acetic, however, the 5(10)-isomer, i.e., 17-acetoxy-17-cyanoestr-5(10)-en-3-one is produced. When the latter substance is allowed to react with lithium tri-(tertiary-butoxy) aluminum hydride in tetrahydrofuran solution, there is produced 17-acetoxy-17-cyanoestr-5(10)-en-3α-ol. In an analogous manner, the aforementioned 17-acetoxy-17-cyano-estr-4-en-3-one is converted to 17-acetoxy-17-cyanoestr-4-en-3β-ol.

Cleavage of the 17-acyloxy-17-cyano moiety of the latter intermediates is accomplished by reaction with an alkaline reagent, preferably one which provides a solution having a pH greater than 8. Examples of suitable alkaline reagents are sodium hydroxide, potassium hydroxide, sodium carbonate, potassium carbonate, calcium oxide, etc. The aforementioned 17-acetoxy-17-cyanoestr-5(10)-en-3α-ol, as a specific example, is heated briefly with aqueous potassium hydroxide in methanol to afford 3α-hydroxyestr-5(10)-en-17-one. Utilizing analogous conditions, 17-acetoxy-17-cyanoestr-4-en-3β-ol is converted to 3β-hydroxyestr-4-en-17-one.

The 3-hydroxy-17-keto compounds provided as the final products of the process of the present invention are useful as intermediates in the manufacture of known pharmacological agents. The aforementioned 3β-hydroxyestr-4-en-17-one upon ethynylation of the 17-keto group affords 17α-ethynylestr-4-ene-3β,17β-diol which, as is described in U.S. Patent 2,843,609, possesses hormonal, particularly luteoid properties.

The invention will appear more fully from the examples which follow. These examples are given by way of illustration only, however, and are not to be construed as limiting the invention either in spirit or in scope as many modifications both in methods and materials will be apparent to those skilled in the art. In these examples temperatures are given in degrees centigrade (° C.) and quantities of materials in parts by weight except where otherwise noted.

EXAMPLE 1

To a slurry of one part of 3-methoxyestra-2-5(10)-dien-17-one with 3.7 parts of acetone cyanohydrin is added 0.05 part of triethylamine, and the resulting reaction mixture is heated at the reflux temperature for about one minute. After standing at room temperature for about 10 minutes, the solution changes to a solid mass. That mass is broken up with the addition of approximately 2 parts of acetone cyanohydrin, and the solid material is collected by filtration. Recrystallization of that crude material from ethyl acetate affords 17-cyano-17-hydroxyestra-2,5(10)-dien-3-ol 3-methyl ether, melting at about 174–177° with decomposition.

EXAMPLE 2

To a mixture of 5 parts of 17-cyano-17-hydroxyestra-2,5(10)-dien-3-ol 3-methyl ether with 25 parts of acetic anhydride is added 50 parts of dry pyridine, and the resulting solution is allowed to stand at room temperature for about 48 hours. At the end of the reaction period, the mixture is poured into excess cold dilute acetic acid, and the precipitate which forms is collected by filtration, washed on the filter with water and dried in air. The crude product thus obtained is purified by recrystallization from ethyl acetate to yield pure 17-acetoxy-17-cyanoestra-2,5(10)-dien-3-ol 3-methyl ether, melting at about 160–162.5°.

EXAMPLE 3

To a solution of 3 parts of 17-acetoxy-17-cyanoestra-2,5(10)-dien-3-ol 3-methyl ether in 48 parts of methanol is added a solution of 3.6 parts of concentrated hydrochloric acid in 3 parts of water. That reaction mixture is heated at the reflux temperature for about 30 minutes, then is carefully diluted with water. The aqueous mixture is then cooled, resulting in crystallization of the product as platelets. Isolation of that crystalline product by filtration followed by washing on the filter with water affords 17-acetoxy-17-cyanoestr-4-en-3-one, melting at about 164–166°. This compound can be represented by the following structural formula

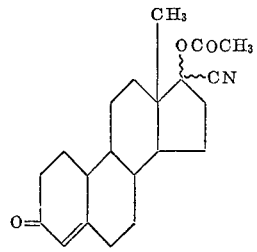

EXAMPLE 4

To a solution of 40 parts of estr-4-ene-3,17-dione in 56 parts of acetone cyanohydrin is added 0.3 part of dry pyridine, and the resulting reaction mixture is allowed to stand at room temperature for about 16 hours. The solid materials which forms during the reaction period is collected by filtration, then is washed on the filter with hexane to afford the crude product. Purification of that material by recrystallization from ethyl acetate affords pure 17-cyano-17-hydroxyestr-4-en-3-one, melting at about 185–189° with decomposition. This compound exhibits an ultraviolet absorption maximum at about 239 millimicrons with a molecular extinction coefficient of about 16,120.

EXAMPLE 5

To a solution of 5 parts of 17-cyano-17-hydroxyestr-4-en-3-one in 25 parts of acetic anhydride, under nitrogen, is added 50 parts of pyridine, and the resulting solution is allowed to stand at room temperature for about 48 hours. That reaction mixture is poured into cold water, and the aqueous mixture obtained is extracted several times with ether. The ether extracts are combined, then washed successively with water, dilute hydrochloric acid and water until neutral. Drying over anhydrous sodium sulfate containing decolorizing carbon followed by removal of the solvent under reduced pressure affords an oily residue which solidifies upon standing. Recrystallization of that crude product from aqueous methanol affords 17-acetoxy-17-cyanoestr-4-en-3-one, melting at about 158–160°. This compound is characterized further by an ultraviolet absorption maximum at about 238.5 millimicrons with a molecular extinction coefficient of about 17,600 and also by infrared absorption peaks at about 3.38, 4.44, 5.68, 5.98, 6.16, 7.28, 7.96 and 8.03 microns. It can be represented by the following structural formula

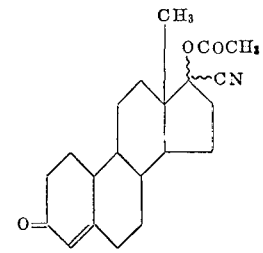

EXAMPLE 6

To a solution of 4.7 parts of 17-acetoxy-17-cyanoestr-4-en-3-one in 72 parts of tetrahydrofuran, in a nitrogen atmosphere, is added, at 0–5° with stirring, a cold solution of 20 parts of lithium tri-(tertiary-butoxy)aluminum hydride in 81 parts of tetrahydrofuran. The resulting reaction mixture is stirred for about 2¾ hours, then is poured carefully into excess dilute acetic acid. The resulting acidic mixture is extracted with ether, and the organic layer is separated, then washed with water until neutral. Drying of that washed solution over anhydrous sodium sulfate containing decolorizing carbon followed by removal of the solvent by distillation under reduced pressure affords 17-acetoxy-17-cyanoestr-4-en-3β-ol as a glass. This compound is further characterized by infrared absorption maxima, in chloroform, at about 2.75, 3.39, 4.43, 5.68, 6.02, 7.28, 7.96 and 8.02 microns.

EXAMPLE 7

When the procedure of Example 6 is repeated with the exception that the reaction mixture is poured into excess aqueous sodium hydroxide rather than into dilute acetic acid, there is obtained a glass-like residue which solidifies upon standing. Recrystallization of that crude solid from aqueous methanol affords pure 3β-hydroxyestr-4-en-17-one, melting at about 123–125°. It is characterized further by infrared absorption peaks, in chloroform, at about 2.70, 2.75, 3.40, 5.75, 6.02 and 6.5 microns.

EXAMPLE 8

A mixture of 10 parts of androst-4-ene-3,17-dione with 14 parts of acetone cyanohydrin is warmed on a steam bath to effect solution, at which time 0.2 part of triethylamine is added. The resulting reaction mixture is kept at room temperature for about 18 hours, and the solid which has precipitated is collected by filtration, washed on the filter with hexane and dried in air. Recrystallization of that crude product from ethyl acetate affords pure 17-cyano-17-hydroxyandrost-4-en-3-one, melting at about 187–188° with decomposition. This compound exhibits an ultraviolet absorption maximum at about 240 millimicrons with a molecular extinction coefficient of about 15,000.

EXAMPLE 9

To a mixture of 3.8 parts of 17-cyano-17-hydroxyandrost-4-en-3-one with 19 parts of acetic anhydride is added, under nitrogen, 38 parts of dry pyridine, and the resulting reaction mixture is allowed to stand at room temperature for about 48 hours. At the end of that reaction period, the mixture is poured into ice and water, and the precipitate which forms is collected by filtration, then is washed with water on the filter and is dried in air. That crude product is purified by recrystallization from methanol to afford 17-acetoxy-17-cyanoandrost-4-en-3-one, melting at about 157–159°. It exhibits an ultraviolet absorption maximum at about 239 millimicrons with a molecular extinction coefficient of about 17,900 and can be represented by the following structural formula

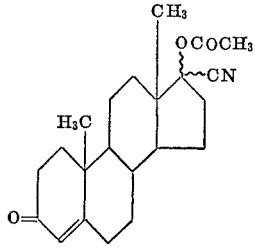

EXAMPLE 10

To a solution of 2 parts of 17-acetoxy-17-cyanoandrost-4-en-3-one in 31.5 parts of tetrahydrofuran, in a nitrogen atmosphere, is added, with stirring at 0–5°, a solution of ten parts of lithium tri-(tertiary-butoxy) aluminum hydride in 67.5 parts of tetrahydrofuran. The resulting reaction mixture is stirred for about 2½ hours, then is poured into 600 parts of ice and water containing 63 parts of glacial acetic acid. That acidic mixture is extracted with ether, and the ether layer is separated, then washed with water until neutral. Drying over anhydrous sodium sulfate affords an organic solution which is stripped of solvent by distillation under reduced pressure to yield 17-acetoxy-17-cyanoandrost-4-en-3β-ol, characterized by infrared absorption maxima, in chloroform, at about 2.75, 3.40, 4.41, 5.69, 6.01, 7.27, 7.95 and 8.01 microns.

EXAMPLE 11

To a solution of 1.5 parts of 17-acetoxy-17-cyano-androst-4-en-3β-ol in 20 parts of methanol is added a solution of 0.5 part of potassium hydroxide in 5 parts of water, and that reaction mixture is kept at room temperature for about 5 minutes. Dilution with water results in precipitation of the solid crude product which is collected by filtration, then washed on the filter with water and dried by exposure to air. That crude substance is purified by recrystallization from aqueous methanol, thus affording 3β - hydroxyandrost - 4 - en - 17 - one, melting at about 135–137°. This substance displays infrared absorption maxima, in chloroform, at about 2.75, 3.40, 5.76 and 6.02 microns.

EXAMPLE 12

To a mixture of 2.5 parts of 11β-hydroxyestr-4-ene-3,17-dione with 5.6 parts of acetone cyanohydrin is added 0.1 part of triethylamine, and the resulting reaction mixture is kept at room temperature for about 1 hour. The resolidified mass which forms is broken up, and the solid material is collected by filtration and dried in air to afford the crude product. Recrystallization of that substance from ethyl acetate affords pure 17-cyano-11β,17-dihydroxyestr-4-en-3-one, melting at about 195–197° with decomposition. This compound exhibits an optical rotation of +22° in dioxane and an ultraviolet absorption maximum at about 240 millimicrons with a molecular extinction coefficient of about 17,300.

EXAMPLE 13

A mixture containing one part of 17-cyano-11β,17-dihydroxyestr-4-en-3-one, 16 parts of pyridine and 8 parts of acetic anhydride is stored at room temperature, in a nitrogen atmosphere, for about 40 hours, then is poured carefully into a mixture of ice and water. The precipitate which forms is isolated by filtration, then is washed on the filter with water and dried in air. That crude material is recrystallized either from aqueous methanol or from ethyl acetate-hexane to yield pure 11β,17-diacetoxy-17-cyanoestr-4-en-3-one, melting at about 149–151°. This substance is characterized further by an ultraviolet absorption maximum at about 237.5 millimicrons with a molecular extinction coefficient of about 16,000 and also by the following structural formula

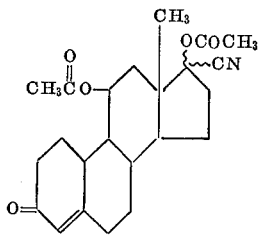

EXAMPLE 14

To an ice cold solution of 7 parts of 11β,17-diacetoxy-17-cyanoestr-4-en-3-one in 135 parts of tetrahydrofuran is added a solution of 30 parts of lithium tri-(tertiary-butoxy) aluminum hydride in 135 parts of tetrahydrofuran. The resulting reaction mixture is stirred for about 90 minutes, then is poured into excess dilute acetic acid. Extraction of that acidic mixture with ether, following saturation of the acidic mixture with sodium chloride, affords an organic solution which is washed successively with water and 5% aqueous sodium bicarbonate, then is dried over anhydrous sodium sulfate. Removal of the solvent by distillation in vacuo affords 11β,17-diacetoxy-17-cyanoestr-4-en-3β-ol as a glass, which is characterized by infrared absorption maxima, in chloroform, at about 2.75, 3.40, 4.45, 5.69, 5.74 and 7.96 microns.

EXAMPLE 15

To a solution of 5 parts of 11β,17-diacetoxy-17-cyanoestr-4-en-3β-ol in 400 parts of methanol is added a solution of 4 parts of sodium carbonate in 50 parts of water, and that reaction mixture is heated at the reflux temperature for about 5 minutes. Dilution with water affords an aqueous mixture which is extracted with ethyl acetate. The organic layer is separated, then is washed with water and dried over anhydrous sodium sulfate. Stripping of the solvent under reduced pressure affords a solid residue which changes to a glass upon attempted recrystallization from aqueous methanol. This glass-like product is 11β-acetoxy-3β-hydroxyestr-4-en-17-one and is characterized by infrared absorption maxima, in chloroform, at about 2.75, 3.40, 5.73, 5.76, 6.00, 7.99 and 9.77 microns.

EXAMPLE 16

To a solution of 5 parts of 11β,17-diacetoxy-17-cyanoestr-4-en-3β-ol in 400 parts of methanol, is added a solution of 5 parts of potassium hydroxide in 50 parts of water, and that reaction mixture is heated at the reflux temperature for about one hour. Dilution of the mixture with water affords a solid precipitate upon cooling. Recrystallization of that crude material from aqueous methanol yields pure 3β,11β-dihydroxyestr-4-en-17-one, which exhibits infrared absorption maxima, in chloroform, at about 2.75, 3.36, 3.41, 5.75, 6.00 and 9.62 microns.

EXAMPLE 17

To a mixture of 10 parts of 5α-androst-1-ene-3,17-dione with 14 parts of acetone cyanohydrin is added 0.15 part of triethylamine, and that reaction mixture is stirred until homogeneous, then is allowed to stand at room temperature for about 24 hours. Concentration of that mixture to dryness by distillation under reduced pressure affords an oily-like residue containing 17-cyano-17-hydroxyandrost-1-en-3-one. That oily material is dissolved in 150 parts of pyridine, and there is added to the resulting solution 75 parts of acetic anhydride. That acetylation mixture is kept at room temperature for about 48 hours, then is poured carefully into cold water. Extraction of the aqueous mixture with ether affords an organic solution, which is washed successively with dilute hydrochloric acid and 5% aqueous sodium bicarbonate, then is dried over anhydrous sodium sulfate. Removal of the solvent by distillation under reduced pressure affords 17-acetoxy-17-cyano-5α-androst-1-en-3-one as an oil. It is characterized further by an ultraviolet absorption maximum at about 240 millimicrons and by infrared absorption peaks at about 3.40, 5.68, 5.99, 7.28, 8.00 and 8.68 microns and is represented by the following structural formula

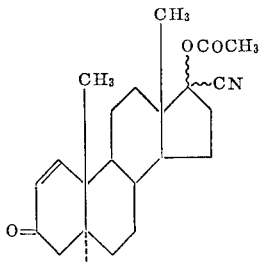

EXAMPLE 18

To a solution of 12 parts of 17-acetoxy-17-cyano-androst-1-en-3-one in 180 parts of tetrahydrofuran is added, at 0–5°, a solution of 60 parts of lithium tri-(tertiary-butoxy) aluminum hydride in 180 parts of tetrahydrofuran. That reaction mixture is stirred for about 2½ hours, then is poured into a large volume of water containing 10 parts of sodium hydroxide. The resulting alkaline solution is allowed to stand at room temperature for about 30 minutes, then is acidified by the addition of acetic acid. Extraction of that acidic mixture with ether followed by separation of the two layers affords an organic solution, which is washed successively with water and dilute aqueous sodium bicarbonate, then is dried over anhydrous potassium carbonate containing decolorizing carbon. Removal of the solvent by distillation under reduced pressure affords an oily-like residue which is purified by chromatography on a silica gel column. Elution of the column with 30% ethyl acetate in benzene affords pure 3β-hydroxyandrost-1-en-17-one, characterized by infrared absorption maxima at about 2.75, 3.40, 5.75 and 6.02 microns.

EXAMPLE 19

A solution of 1.5 parts of 17-acetoxy-17-cyano-estra-2,5(10)-dien-3-ol 3-methyl ether in 22 parts of acetic acid containing 2.3 parts of water is allowed to stand at room temperature for about 90 minutes, then is carefully diluted with water to the point of incipient turbidity. Cooling of that mixture at 0–5° results in precipitation of the crude product, which is collected by filtration, then washed with water and dried in air. The crude material thus produced is purified by recrystallization from aqueous methanol to afford needle-like crystals of 17-acetoxy-17-cyanoestr-5(10)-en-3-one, melting at about 129–132°. This compound exhibits an optical rotation of +105° in chloroform and is characterized further by the following structural formula

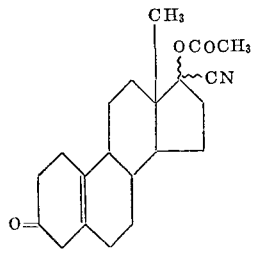

EXAMPLE 20

To a solution of 8 parts of 17-acetoxy-17-cyanoestr-5(10)-en-3-one in 135 parts of tetrahydrofuran, at 0–5°, is added with stirring a solution of 35 parts of lithium tri-(tertiary-butoxy) aluminum hydride in 135 parts of tetrahydrofuran. The resulting reaction mixture is stirred for about one hour longer, then is allowed to stand at room temperature for about 2 hours. At the end of that time it is poured into excess dilute acetic acid. Saturation of that mixture with solid sodium chloride followed by extraction with ether affords an organic layer, which is washed with water, dried over anhydrous sodium sulfate and stripped of solvent under reduced pressure. The resulting glass-like product is 17-acetoxy-17-cyanoestr-5(10)-en-3α-ol, characterized by infrared absorption peaks, in chloroform, at about 2.75, 3.41, 4.43, 6.02 and 7.96 microns.

EXAMPLE 21

To a solution of 7 parts of 17-acetoxy-17-cyanoestr-5(10)-en-3α-ol in 200 parts of methanol is added a solution of 5 parts of potassium hydroxide in 60 parts of water. The resulting reaction mixture is stirred at the reflux temperature for about 10 minutes, then is diluted with water. The precipitate which forms is collected by filtration, washed with water and dried in air to afford 3α-hydroxyestr-5(10)-en-17-one, melting at about 180–182°. This compound is further characterized by infrared absorption peaks, in chloroform, at about 2.75, 3.41, 5.75 and 6.01 microns.

What is claimed is:

1. A process for the manufacture of 3-hydroxy-17-keto steroids which comprises contacting the corresponding 3-keto-17-acyloxy-17-cyano steroid with a metal hydride reducing agent, then contacting the resulting product with an alkaline reagent producing a solution of pH greater than 8.

2. A process for the manufacture of 3-hydroxy-17-keto steroids which comprises contacting a 17-keto steroid containing at the 3-position either an unreactive keto group or group readily hydrolyzable to a keto group with a source of hydrogen cyanide, contacting the resulting 17-hydroxy-17-cyano steroid with an acylating agent, contacting the resulting 17-acyloxy-17-cyano steroid with a metal hydride reducing agent, or, when appropriate, first hydrolyzing the function at the 3-position to afford a 3-keto group, then contacting that substance with a metal hydride reducing agent, and cleaving the 17-acyloxy-17-cyano function with an alkaline reagent producing a solution of pH greater than 8.

3. A process for the manufacture of a compound of the formula

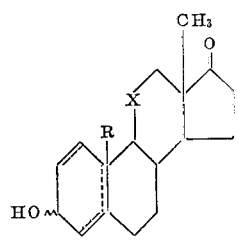

wherein R is selected from the group consisting of hydrogen and a methyl radical, X is a member of the class consisting of methylene and β-hydroxymethylene groups, the dotted lines represent an unsaturated linkage selected from the class consisting of 1,2; 4,5 and 5(10) double bonds, and the wavy lines indicate the alternative α or β configuration, which comprises contacting a compound of the formula

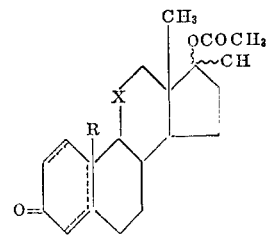

with a metal hydride reducing agent, then contacting the resulting product with an alkaline reagent producing a solution of pH greater than 8.

4. A process for the manufacture of 3β-hydroxyestr-4-en-17-one which comprises contacting 17-acetoxy-17-cyanoestr-4-en-3-one with a metal hydride reducing agent, then contacting the resulting product with an alkaline reagent producing a solution of pH greater than 8.

5. A process for the manufacture of 3β-hydroxyestr-4-en-17-one which comprises contacting 17-acetoxy-17-cyanoestr-4-en-3-one with lithium tri-(tertiarybutoxy) aluminum hydride, then contacting the resulting product with sodium hydroxide.

6. A process for the manufacture of 3β-hydroxyestr-4-en-17-one which comprises contacting 17-acetoxy-17-cyanoestra-2,5(10)-dien-3-ol 3-methyl ether with lithium tri-(tertiary-butoxy) aluminum hydride, then contacting the resulting product with sodium hydroxide.

7. A compound of the formula

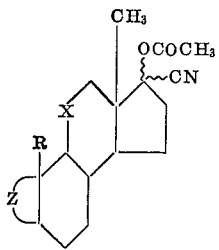

wherein R is selected from the group consisting of hydrogen and a methyl radical, X is a member of the class consisting of methylene and β-hydroxymethylene radicals, and Z taken together with the carbon atom at each terminus is a 6-membered ring selected from the group consisting of

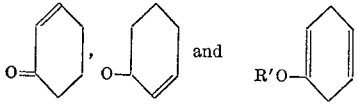

R' in the latter formula representing a lower alkyl radical.

8. 17-acetoxy-17-cyano-5α-androst-1-en-3-one.
9. 17-acetoxy-17-cyano - 11β - hydroxyandrost-4-en-3-one.
10. 17-acetoxy-17-cyanoestra-2,5(10)-dien-3-ol 3-methyl ether.
11. 17-acetoxy-17-cyanoandrost-4-en-3-one.
12. 17-acetoxy-17-cyanoestr-4-en-3-one.

References Cited
UNITED STATES PATENTS 2,742,485  4/1956  Ercoli et al. _____ 260—397.4
3,272,801  9/1966  Marshall et al. ____ 260—239.55

HENRY A. FRENCH, *Primary Examiner.*

U.S. Cl. X.R.
260—397.45, 397.5